United States Patent [19]

Föhl

[11] 4,378,913

[45] Apr. 5, 1983

[54] DEVICE FOR SECURING AGAINST AXIAL DISPLACEMENT

[75] Inventor: Artur Föhl, Schorndorf, Fed. Rep. of Germany

[73] Assignee: Repa Feinstanzwerk GmbH, Alfdorf, Fed. Rep. of Germany

[21] Appl. No.: 303,925

[22] Filed: Sep. 21, 1981

Related U.S. Application Data

[63] Continuation of Ser. No. 917, Jan. 4, 1979, abandoned.

[30] Foreign Application Priority Data

Jan. 5, 1978 [DE] Fed. Rep. of Germany ....... 2800497

[51] Int. Cl.³ ............................................. F16B 21/02
[52] U.S. Cl. .................................... 242/74; 24/221 R; 242/107.4 R; 411/349; 411/511; 411/521
[58] Field of Search ............... 411/517, 521, 516, 511, 411/349, 337; 242/107.4 R–107.4 E, 74; 24/221 R

[56] References Cited

U.S. PATENT DOCUMENTS 711,503 10/1902 Jackson .
1,675,277 6/1928 Roe ...................................... 411/533
2,574,134 11/1951 Vigren et al. .
2,581,288 1/1952 Pletcher ............................... 411/520
3,023,473 3/1962 Cochran ............................... 411/529
3,738,217 6/1973 Walker ................................. 411/510
4,006,659 2/1977 Werzel et al. ........................ 411/518
4,135,682 1/1979 Mizuno .......................... 242/107.4 B

FOREIGN PATENT DOCUMENTS 1475028 7/1969 Fed. Rep. of Germany .

Primary Examiner—Thomas J. Holko
Attorney, Agent, or Firm—Herbert L. Lerner

[57] ABSTRACT

Device for securing an element projecting through an opening against axial displacement of the element including an end of the element projecting through the opening being formed with a noncircular cross-section and with a peripheral slot, and a perforated disc mounted on the projecting end and having at least a part thereof formed of material harder than that of the element, the perforated disc having an inner contour corresponding to the cross-section of the projecting end and, after being mounted on the projecting end, being turnable relative to the element to an extent that at least the part thereof formed of the harder material engages in the peripheral slot.

2 Claims, 3 Drawing Figures

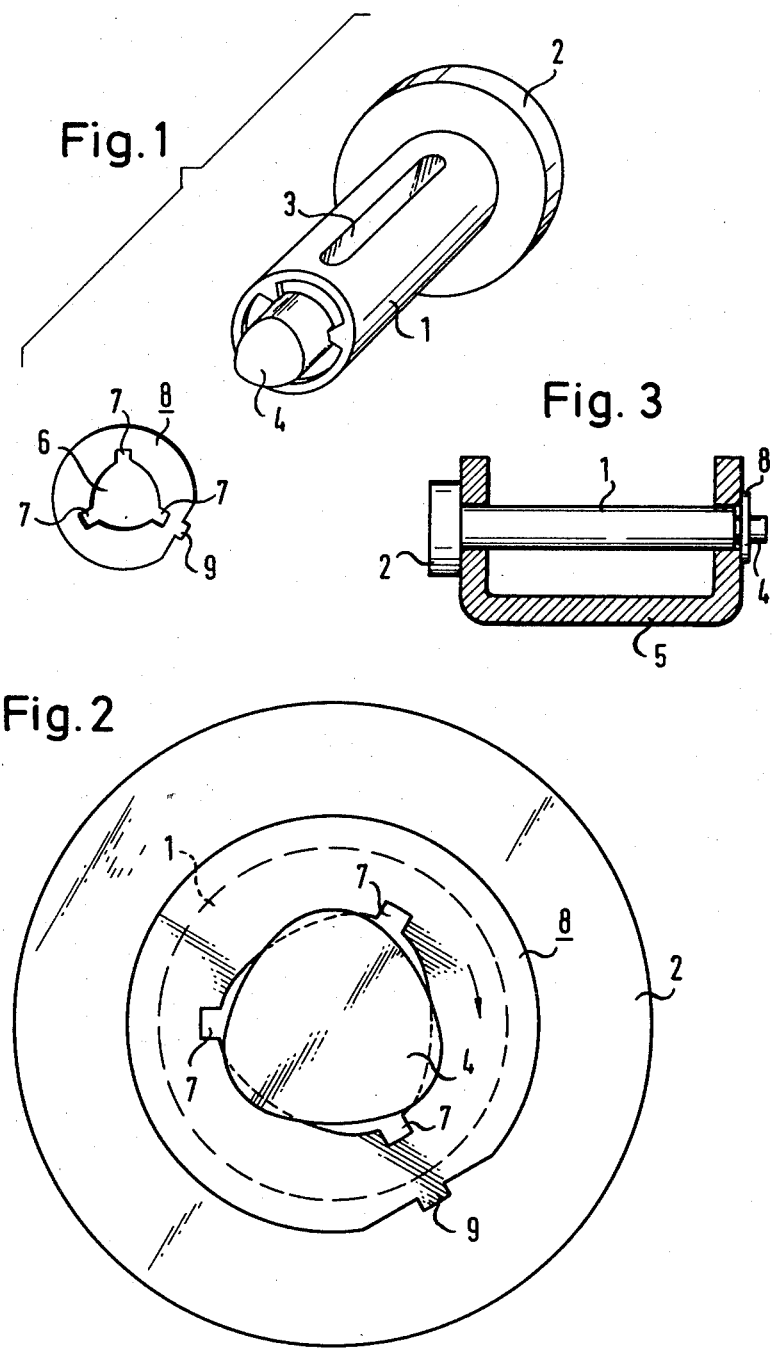

DEVICE FOR SECURING AGAINST AXIAL DISPLACEMENT

This is a continuation of application Ser. No. 000,917, filed Jan. 4, 1979, now abandoned.

The invention relates to a device for securing against axial displacement and, more particularly, for securing an element projecting through an opening i.e. a shaft of an automatic roll-up device for safety belts mounted in a U-shaped bracket or beam, for example, against axial displacement thereof.

Heretofore known securing or locking devices of this general type are formed of a circlip or so-called Seeger ring which is inserted into an annular groove or slot incised into the shaft that is to be secured against axial displacement.

Such heretofore known devices have as prerequisites the expense of incising the annular groove into the shaft. The location of the securing device in axial direction is thereby determined of fixed i.e. no longer freely selective.

It has also been proposed heretofore to secure or lock shafts or axles against displacement in axial direction thereof by so-called speed fixes. Such elements in order to grip adequately reliably, must however have a flat side to engage a support or abutment, which means that, for such shaft or axle-securing devices, the fastening element rubs against the support or abutment as the shaft or axle rotates. In many instances, undesirable frictional losses and, under certain conditions, undesirable abrasion consequently arise therefrom.

It is accordingly an object of the invention to provide a securing or locking device of the foregoing general type wherein the position of the securing element in axial direction is selective and the securing element does not resiliently engage a support or abutment.

With the foregoing and other objects in view, there is provided, in accordance with the invention, a device for securing an element projecting through an opening against axial displacement of the element, such as a shaft of an automatic roll-up device for safety belts which is mounted in a U-shaped bracket, comprising an end of the element projecting through the opening being formed with a noncircular cross section and with a peripheral slot, and a perforated disc mounted on the projecting end and having at least a part thereof formed of material harder than that of the element, the perforated disc having an inner contour corresponding to the cross section of the projecting end and, after being mounted on the projecting end, being turnable relative to the element to an extent that at least the part thereof formed of the harder material engages in the peripheral slot.

In accordance with another feature of the invention, the inner contour of the perforated disc is interrupted by slot-shaped recesses.

In accordance with a further feature of the invention at least one projection is formed at an outer peripheral region of the perforated disc for facilitating turning thereof.

Through these features of the invention, it is possible to secure or lock an element projecting through an opening, such as a shaft or axle, against axial displacement without production of any significant friction losses due to the securing element.

Moreover, manufacturing tolerances can be compensated for or equalized on a large scale. These features have an especially advantageous effect particularly for mass-produced articles such as automatic roll-up or wind-up devices for safety belts, for example.

Other features which are considered as characteristic for the invention are set forth in the appended claims.

Although the invention is illustrated and described herein as embodied in a device for securing against axial displacement, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is an exploded perspective view of a shaft of an automatic roll-up device for safety belts with a perforated disc as locking or securing element embodying the invention;

FIG. 2 is an enlarged end view of FIG. 1 as seen from the shaft end being locked or secured; and FIG. 3 is a diagrammatic cross-sectional, on a reduced scale, of the shaft and perforated disc assembly of FIG. 1 in an automatic roll-up device for safety belts secured against axial displacement.

Referring now to the drawing and first, particularly, to FIG. 1 thereof, there is shown a shaft 1 for an otherwise non-illustrated automatic roll-up device for safety belts having at one end thereof, a projection 2 cooperable with a locking mechanism and being formed, in a middle region thereof, with a groove 3 wherein an end of a safety belt, also otherwise non-illustrated, is fastenable. The shaft end 4 located opposite to the end at which the projection 2 is located projects laterally beyond a U-bracket 5 which serves as a bearing for the shaft 1, the shaft end 4 being of noncircular cross section and generally constructed in the form of a triangle with sharply rounded-off corners. The perforated disc or washer 8 is formed with a central opening 6 having a cross section corresponding to that of the shaft end 4. The contour of the central opening 6 is interrupted by groove or notch-shaped cut-outs 7 at the corners of the triangular cross section. In addition, the perforated disc or washer 8 has a projection 9 at the outer periphery thereof which facilitates turning or rotation thereof on the shaft end 4.

After the shaft 1 has been inserted into the U-bracket 5, the perforated disc or washer 8 is slid onto the shaft end 4 and, after the permissible play has ceased, is turned to such an extent relatively to the shaft 1 that it reaches the position thereof shown in FIG. 2. The shaft end 4 is formed with a peripheral slot-shaped recess or depression 10 into which the perforated disc or washer 8 engages and is thereby axially fixed. A prerequisite for the device according to the invention which secures against axial displacement is that the perforated disc or washer 8 be formed of a harder material than that of the shaft 1.

There is claimed:

1. Device for securing an element projecting through an opening against axial displacement of the element comprising a first end of the element projecting through the opening being formed with a noncircular cross-section and with a peripheral slot, a closed substantially circular perforated disc mounted on said projecting first end for rotating therewith and having at least a part thereof formed of material harder than that of the element, said perforated disc having an inner contour corresponding to the cross-section of said projecting first end, slot-shaped recesses interrupting said inner contour, at least one projection formed at an outer peripheral region thereof within the substantially circular periphery thereof for facilitating turning thereof and, after being mounted on said projecting first end, said perforated disc being turnable relative to the element to an extent that at least said part thereof formed of said harder material engages in said peripheral slot, a U-shaped bearing bracket having said opening formed therein and another opening formed therein, said perforated disc being disposed outside said bracket, said element having a second end and being a shaft rotatably projecting through said openings and having another slot formed therein between said ends for securing the end of a safety belt, and another projection larger than said other opening being integral with said second end outside said bracket.

2. Device according to claim 1 wherein said noncircular cross-section of said first end is in the form of a rounded triangle.

* * * * *